United States Patent
Martindale et al.

[11] 3,712,583
[45] Jan. 23, 1973

[54] VALVED FOR LINES CARRYING EXTREME TEMPERATURE FLUIDS

[75] Inventors: David L. Martindale; Alan M. Dale, both of La Mesa; Richard C. Mursinna, San Diego; Gene R. Rewerts, Lakeside, all of Calif.

[73] Assignee: Ametek, Inc., El Cajon, Calif.

[22] Filed: Jan. 25, 1971

[21] Appl. No.: 109,373

[52] U.S. Cl. ............251/149.4, 251/149.6, 285/47, 285/354, 285/423
[51] Int. Cl. ......................F16l 29/00, F16l 37/28
[58] Field of Search..251/149.4, 149.5, 149.6, 149.7, 251/368; 285/24, 27, 47, 53, 353, 354, 367, 397, 174, 423

[56] References Cited

UNITED STATES PATENTS

| 404,918 | 6/1889 | Linindoll | 251/149.4 |
| 1,794,905 | 3/1931 | Kass | 285/354 |
| 3,116,943 | 1/1964 | Wagner | 285/312 |
| 3,280,849 | 10/1966 | Rendos et al. | 285/367 X |
| 3,484,121 | 12/1969 | Quinton | 285/423 X |
| 2,726,104 | 12/1955 | Boitnott et al. | 285/354 X |
| 3,068,026 | 12/1962 | McKamey | 285/47 |
| 1,783,410 | 12/1930 | Cowell | 285/353 X |
| 2,968,497 | 1/1961 | Treleman | 251/149.4 |
| 3,034,319 | 5/1962 | Chelton | 285/47 X |
| 3,130,555 | 4/1964 | Haettinger | 285/47 X |

FOREIGN PATENTS OR APPLICATIONS

| 1,241,917 | 8/1960 | France | 285/353 |

Primary Examiner—William R. Cline
Attorney—Carl R. Brown and Neil F. Martin

[57] ABSTRACT

A coupling for lines carrying extreme temperature fluids, such as fluids at cryogenic temperatures, that employs an inner and an outer seal separated by thermal insulating material with parallel faces. The parallel faces form a restricted sealed space between the seals in which vapor that may escape through the inner seal is trapped forming a vapor barrier to further leakage through the inner seal and to thermal conductivity of the extreme temperature of the conducted fluid to the outer seal, thus allowing the outer seal to be an ambient temperature seal.

17 Claims, 6 Drawing Figures

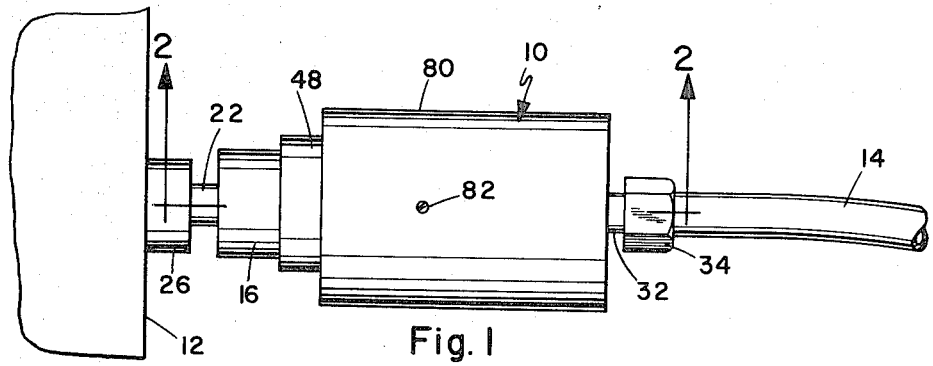
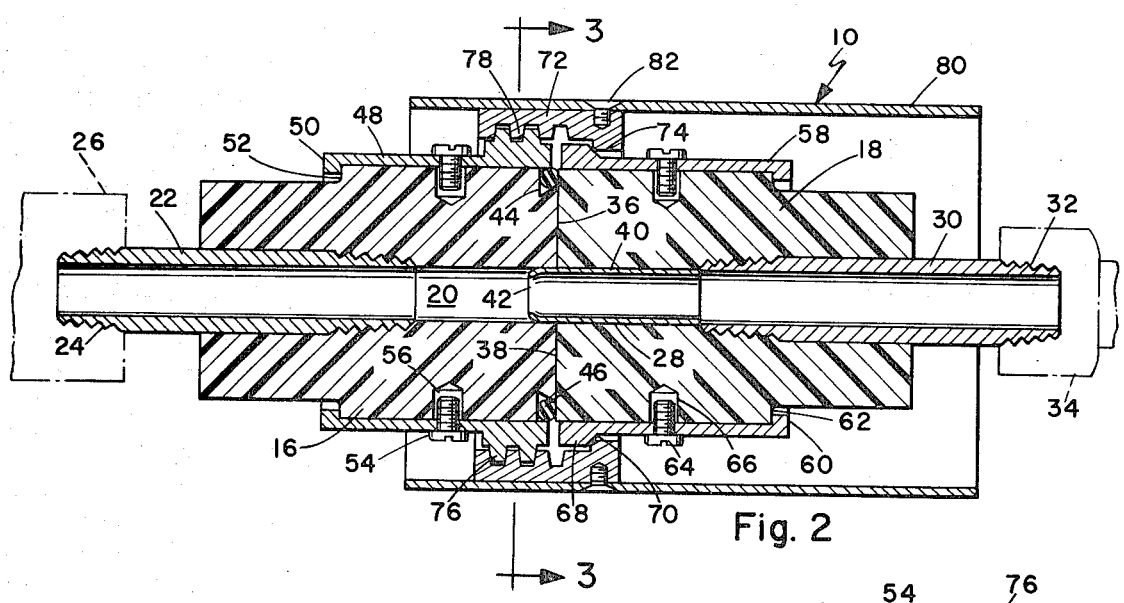
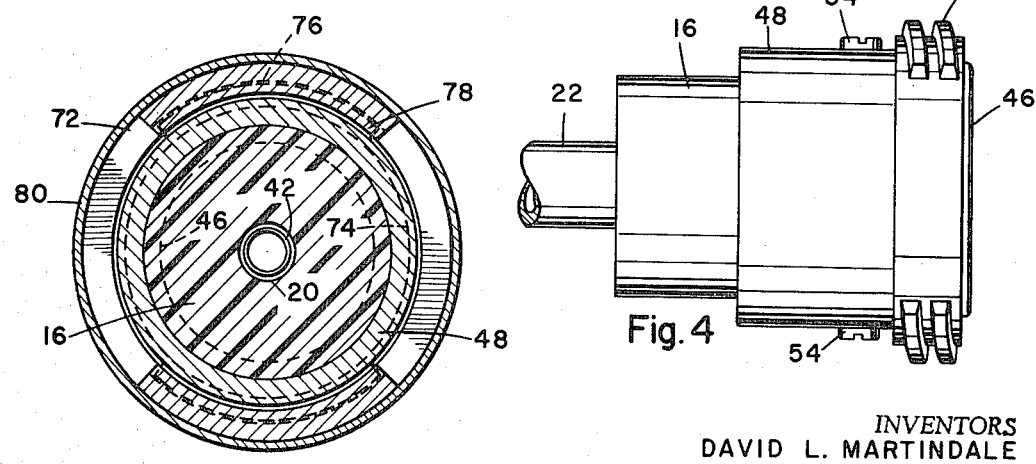
INVENTORS
DAVID L. MARTINDALE
ALAN M. DALE
RICHARD C. MURSINNA
GENE R. REWERTS
BY Brown & Martin
ATTORNEYS

VALVED FOR LINES CARRYING EXTREME TEMPERATURE FLUIDS

BACKGROUND OF THE INVENTION

A major problem in the handling of fluids at extreme temperatures, particularly at cryogenic temperatures, has been the design of couplings for the fluid transmission lines or conduits. In continuous flow or long period operation, all lines and connections are usually insulated and couplings are not often disturbed. For short period operation, such as in transferring fluid between containers, couplings must be frequently closed and opened. Such couplings must be very secure to avoid leakage and must be capable of accommodating dimensional changes due to contraction and expansion when subjected to extreme thermal variations. Most couplings require the use of a wrench or other tool and are difficult to handle because of the extreme temperatures. Typical couplings have elaborate multiple seals, bellows and other such compensating devices. These seals are often required to be able to be in substantially direct contact with the extreme temperature fluids carried by the connected lines. In systems requiring frequent coupling of the lines, such extreme temperature seals are difficult and expensive to make and effectively use. Thus it is advantageous to have a secure coupling which can be safely connected and disconnected without tools, and which substantially eliminates the problem of ice buildup.

SUMMARY OF THE INVENTION

The preferred embodiment of the coupling described herein is adaptable to fluid systems operating over a wide range of very high and very low temperatures and at various flow rates and pressures. A large hand grip, thermally insulated from the fluid line, is used to connect and disconnect the coupling manually. The two interfitting elements of the coupling are of low thermal conductivity and have a face to face abutting joint with simple inner fluid and outer vapor sealing means. The hand grip encloses the joint and acts as a shield to prevent residual fluid from splashing on the operator.

The inner seal functions to seal the coupling connection against leakage of the fluid conducted through the coupling means. The outer sealing means is thermally protected from the conducted fluid by the low thermal conductivity of the body portions of the coupling means and any leakage of the fluid through the inner sealing means and into the space between the opposing faces of the body portions is either vapor or is vaporized by the more ambient temperature of the space. This vapor is trapped between the two seals in the very narrow space between the faces and a vapor barrier is formed to oppose further leakage of the inner sealing means. Also, since the trapped gas has a low thermal conductivity, it forms a thermal barrier between the inner and outer sealing means. The space between the confronting parallel faces is very narrow and is normally only that space resulting from thermal contraction of the bodies resulting from cryogenic conducted fluids. Thus a coupling of thermally insulating material is used to protect a simple ambient temperature seal from the extreme temperatures of the fluid media within the coupling and a vapor barrier is provided to protect the outer seal against undesired leakage of the inner seal and against thermal damage of the outer seal because of such possible leakage.

The primary object of this invention, therefore, is to provide a new and improved coupling for conducting extreme temperature fluids.

Another object of this invention is to provide a new and improved coupling for conducting extreme temperature fluids that is easily connected and disconnected by hand and incorporates simple but secure sealing means.

A further object of this invention is to provide a new and improved cryogenic coupling having a hand grip which shields the joint and protects the operator.

Another object of this invention is to provide a new and improved coupling for conducting extreme temperature fluids which coupling employs thermally insulating material to protect a simple ambient temperature seal from the extreme temperature of the fluid media within the coupling.

Another object of this invention is to provide a new and improved coupling for conducting extreme temperature fluids by use of a combination of inner and outer seals with a thermal and gas barrier between the seals.

Other objects and many advantages of this invention will become more apparent upon a reading of the following detailed description and an examination of the drawing wherein like reference numerals designate like parts throughout and in which:

FIG. 1 is a side elevation view of the coupling in a typical installation.

FIG. 2 is an enlarged sectional view taken on line 2—2 of FIG. 1.

FIG. 3 is a sectional view taken on line 3—3 of FIG. 2.

FIG. 4 is a side elevation view of one coupling member.

DESCRIPTION OF THE PREFERRED EMBODIMENTS

Figure 5:
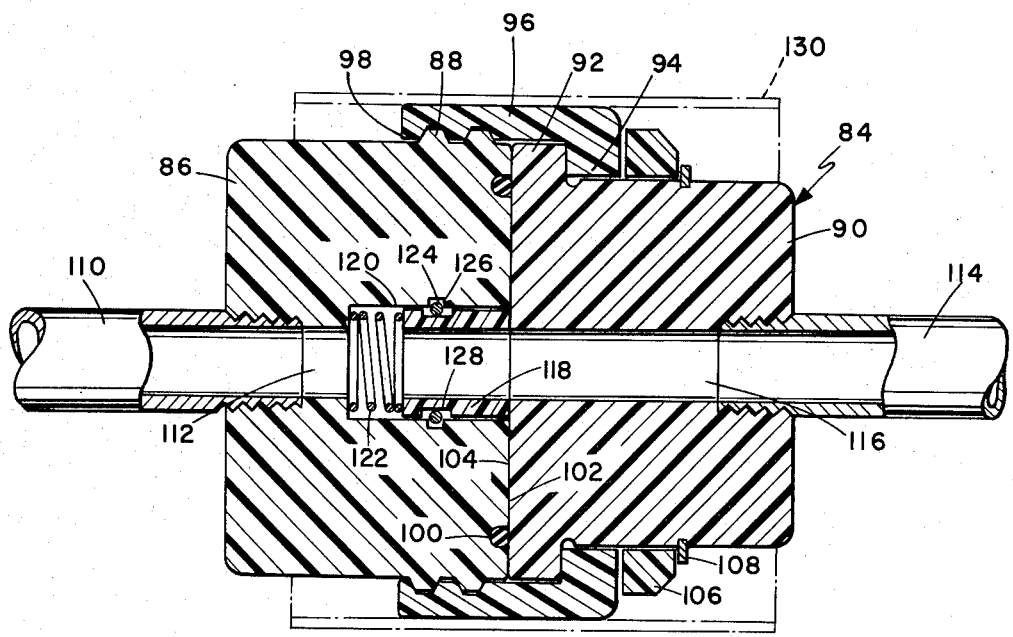
FIG. 5 is a sectional view of an alternative form of the coupling.

One form of the coupling 10, is shown in FIG. 1 as connected between a tank 12 and a hose 14, which is merely one example of use. The coupling itself comprises a generally cylindrical coupling body 16 and a similar coupling body 18, each made from plastic or other material of low thermal conductivity, capable of retaining its desirable properties at extremes of temperature. Suitable materials are Delrin, Teflon, certain acrylics and the like, depending on the particular fluids to be handled. Body 16 has an axial bore 20 in which is secured a stub pipe 22, having an extended threaded end 24 which screws into the connection fitting 26 of tank 12. Body 18 has an axial bore 28 in which is secured a stub pipe 30, having a threaded end 32 to receive the coupling nut 34 of hose 14.

Body 16 has an end face 36 which is held in substantially abutting contact with a corresponding face 38 of body 18. Fixed in axial bore 28 is a tubular plug 40 having a projecting nose portion 42 which fits closely into axial bore 20 and serves to align the coupling, as well as acting as a fluid seal. The end face 36 has a peripheral groove 44, which is undercut to retain an O-ring 46 of elastomeric material such as silicone rubber. The O-ring provides the vapor seal for the coupling and, being thermally insulated from the fluid passage by the plastic body, is maintained in near ambient conditions and so retains its elasticity. The single O-ring shown has been found to be effective, but additional sealing means could be used in either body element.

Fitted concentrically on body 16 is a locking sleeve 48 having at its outer end an inwardly turned flange 50, which engages a shoulder 52 formed in the body. The locking sleeve 48 is retained on body 16 by screws 54 threaded through the sleeve into sockets 56 in the body. It should be noted that the screws are not threaded into the sockets, but merely hold the sleeve in place against rotation while allowing a limited freedom of axial movement. Fitted on body 18 is a clamp sleeve 58 having an inwardly turned flange 60 at the outer end which engages a shoulder 62 on the body, the clamp sleeve being held by screws 64 extending into sockets 66. The inner end of clamp sleeve 58 has a radially projecting rim 68 with an inclined clamp face 70.

Rotatably mounted on clamp sleeve 58 is a locking ring 72, having an inwardly projecting clamp flange 74 which engages clamp face 70. The heads of screws 64 protrude sufficiently to retain the locking ring against removal. The locking ring 72 extends axially to fit over locking sleeve 48, with interfitting locking means. As shown, the locking sleeve 48 has interrupted Acme type external threads 76, locking ring 72 having corresponding interrupted internal threads 78, so that the two elements can be secured by a quarter turn of rotation. This and similar twist lock fastening means are well known and the arrangement shown is merely an example. For high pressure applications a secure twist lock is desirable, but for low pressure systems a simple snap or spring detent arrangement, or any other quick acting clamp means may be suitable.

Secured to the outside of locking ring 72 is a cylindrical sleeve or hand grip 80, held by screws 82 or the like. The hand grip extends axially to enclose body 18 and also extends beyond the locking sleeve in the other direction, the extensions serving to shield the operator from splashing or spurting fluid, particularly when disconnecting the coupling. If necessary, the exterior of hand grip 80 may have a coating or surface treatment to improve gripping.

It should be noted that the sleeves 48 and 58 do not come into contact, the shoulders 52 and 62 limiting the movement of the sleeves toward the respective end faces of the body elements. The sealed connection is made between confronting faces 36 and 38, with the central liquid seal of nose portion 42 and the peripheral vapor seal of O-ring 46. In the closed position of the coupling there is preferably a very small gap of two or three thousandths of an inch between the faces 36 and 38, which allows vapor to enter between the faces and form a barrier to prevent liquid leakage. Being a poor thermal conductor, the vapor also acts as a thermal barrier and will not freeze the O-ring. When the coupling is cooled, the body elements will contract and open the gap between faces 36 and 38, but the nose portion 42 will maintain a liquid seal. Tubular plug 40 could be fixed in either body element, but in the arrangement shown, the nose portion 42 is afforded some protection by the extended hand grip when the coupling is disconnected. As shown, the body elements 16 and 18 are of plastic and the other parts are of metal. However, some or all of the other parts may be of plastic or other material, depending on the specific use. With cryogenic fluid flowing through the coupling, the plastic body elements provide very effective thermal insulation. In a particular example tested, with a ⅜ inch diameter fluid passage and approximately ½ inch radial thickness of thermal insulation in the body elements, a flow of cryogenic fluid was maintained for about 30 minutes, but the temperature of the hand grip did not drop below 40°F. In the uses for which the coupling is primarily intended, flow times will normally be less than this, so bare hand operation by means of the hand grip will be comfortable.

The coupling 84, shown in FIG. 5, has the same thermal insulation arrangement, but incorporates an alternative seal and clamping structure. In coupling 84, body element 86 is a unitary member of low thermal conductivity plastic and has integral external threads 88 for clamping. The other body element 90 has a peripheral rim 92, which is engaged by the clamping flange 94 of a sleeve 96 rotatably mounted on the body element, the sleeve having internal threads 98 which interlock with threads 88. An O-ring 100, inset in the end face 102 of body element 86, seals against the confronting end face 104 of body element 90. Sleeve 96 is held on the body element 90 by a retaining ring 106, which is retained by a snap ring 108. A stub pipe 110 is secured in the axial bore of body element 86 and a stub pipe 114 is secured in the axial bore 116 of body element 90, for connection in the fluid system.

The central liquid seal is maintained by a sealing sleeve 118, slidable in an axial socket 120 counterbored in bore 112, the sealing sleeve being biased by a spring 122 to bear against end face 104 around the periphery of bore 116. The sealing sleeve 118 is retained in body element 86 by a snap ring 124 seated in a groove 126 in bore 112 and projecting into a circumferential channel 128 in the sealing sleeve, the channel being axial elongated to allow limited sliding motion of the sleeve. Any gap occurring between faces 102 and 104, due to contraction, is thus closed against liquid leakage by the sealing sleeve 118. As in the coupling 10, a vapor barrier forms between the confronting end faces to protect the O-ring vapor seal. A protective hand grip 130, indicated in broken line, may be secured to sleeve 96, or the sleeve itself may be extended for the purpose.

Figure 6:
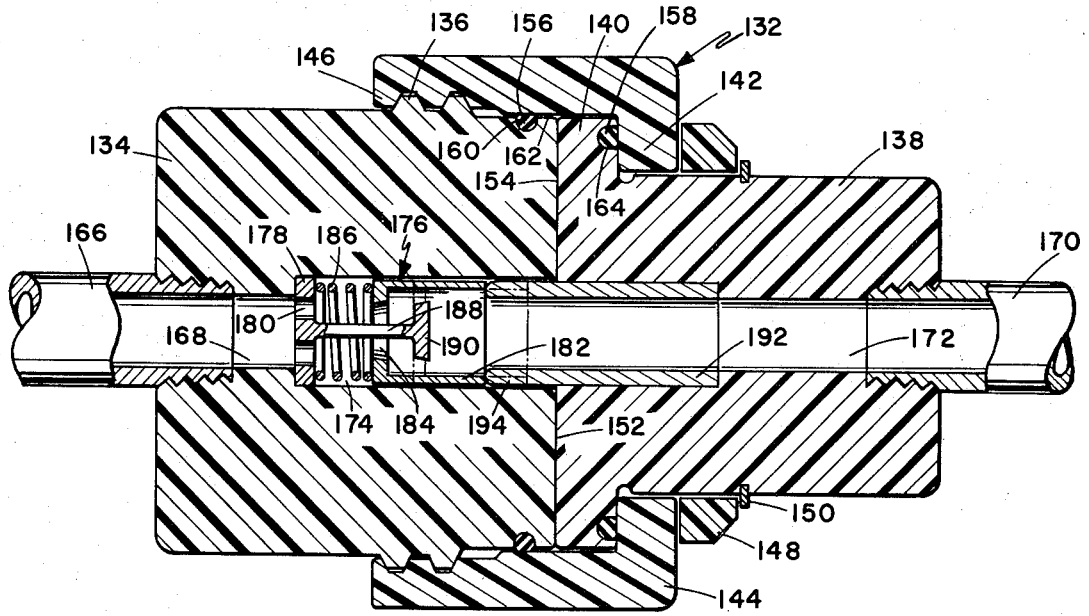
FIG. 6 is a sectional view of another form of the coupling incorporating a shut off valve.

A further coupling 132, shown in FIG. 6, incorporates a valve which shuts off flow when the coupling is disconnected. The coupling comprises a unitary body element 134 with external threads 136, and a body element 138 with a rim 140, which is engaged by the clamping flange 142 of a sleeve 144. The sleeve has internal threads 146 to lock into threads 136 and is held by a retaining ring 148 and snap ring 150. In this configuration, the end faces 152 and 154 of body elements 134 and 138, respectively, are held in contact, the vapor seal being made by a pair of O-rings 156 and 158. The O-ring 156 fits in a circumferential groove 160 around body element 134 and seals against the inner wall 162 of sleeve 144 behind the threads 146. O-ring 158 is inset in a groove 164 in the face of rim 140 against which the clamping flange 142 bears, so that vapor is sealed in on both sides of the body element interface.

A stub pipe 166 is secured in the axial bore 168 of body element 134 for connection to the fluid source, and a stub pipe 170 is secured in axial bore 172 of body element 138 for connection to the associated system. Axial bore 168 has an enlarged counterbore 174, opening to end face 152, to hold a check valve 176. As shown, the valve includes a disc member 178 seated securely in the bottom of counterbore 174, with a plurality of ports 180 therein for fluid passage. A cylindrical cup 182, axially slidable in the counterbore, has a central opening 184, the cup being biased outwardly by a spring 186 between the cup and disc member. Extending axially from disc member 178 is a stem 188, which passes through opening 184 and has a valve element 190 fixed on the end thereof. In the disconnected position of the coupling, spring 186 urges the cup outwardly until valve element 190 seats in the opening 184 and shuts off flow, the closed position of the cup being indicated in broken line.

Fixed in the axial bore of body element 138 is a tubular plug 192, having a protruding nose portion 194 which fits closely into counterbore 174 to form a liquid seal and, at the same time, pushes cup 182 inward to open the valve. The valve action is thus automatic with operation of the coupling. The valve structure shown is merely an example and any other suitable check valve may be used.

As with the coupling 10, the couplings 84 and 132 may utilize any suitable form of clamping instead of the threaded fastening shown. In each form the confronting faces are shown as being radial to the axis, but could be conical, or any other suitable configuration, as long as they are closely parallel. The sealing and the low thermal conductivity of the structure ensure that the outer or vapor seal is maintained at substantially ambient temperature, while fluid at extreme temperature is carried through the coupling. Depending on the materials used and the particular environmental use of the coupling, the ambient temperature could vary from −100° to 500°F., or any temperature at which the material of the outer seal retains its desirable sealing properties.

The coupling has been described for use with cryogenic fluids such as liquified oxygen, nitrogen, methane, or the like. But it will be evident that, with the proper choice of materials, the coupling is also adaptable to high temperature uses. With body elements of Delrin, for example, the coupling can be made with a useful operating range of −430° to +800°F. The structure is very simple and manufacturing tolerances are not particularly critical, since the sealing is between the body elements and the clamping means is not required to be sealed.

It should be recognized that in operation the means for securing the body portions 16 and 18 in FIG. 2, 86 and 90 in FIG. 5 and 134 and 138 in FIG. 6 draws the respective confronting parallel faces together. This also draws the inner sealing means into a sealed condition. When very cold fluid passes through the coupling, thermal contraction of the body portions can result in a very thin space between the parallel faces. However, the inner sealing means are capable of holding the sealed condition. It is normally expected in operation of the invention that the inner sealing means will not leak fluid. But in cryogenic fluid couplings that are capable of easy, quick and repetitive coupling and uncoupling, leakage of the inner sealing means sometimes occurs. However in this invention, if such leakage occurs it is only in the form of a vapor of the fluid conducted and forms the vapor barrier in the manner previously described.

Having described our invention, we now claim.

1. In a coupling for coupling fluid conducting lines for carrying fluids having cryogenic temperatures,
   coupling means for connecting fluid lines for carrying cryogenic temperature fluids in liquid form having non-metallic body portions of low thermal conductivity with confronting parallel faces extending radially outward from an aligned inner passage through said body portions,
   resilient sealing means adjacent the outer edge of said parallel faces,
   securing means for drawing said bodies together forming said outer resilient sealing means and drawing said parallel faces together forming an inner seal of sealing surfaces that prevent the movement of cryogenic liquids between said sealing surfaces to said outer resilient sealing means and forming a vapor trap between the inner edge portion of said sealing surfaces and said resilient sealing means,
   and whereby vapor is trapped between said inner seal and said outer resilient sealing means between said faces that prevents cryogenic temperature liquid leakage between said faces to said resilient sealing means forming a thermal barrier between said inner and outer sealing means.

2. In a coupling as claimed in claim 1 in which,
   said inner seal has second sealing means for maintaining a fluid seal upon slight increased spacing between said sealing surfaces.

3. In a coupling as claimed in claim 2 in which,
   said second sealing means comprises sleeve means for extending into the inner passages of each body portion.

4. In a coupling as claimed in claim 2 in which,
   said second sealing means comprises a sleeve axially slidable in one of said body portions and having resilient means for biasing the sleeve into sealed contact with the other body portions.

5. In a coupling as claimed in claim 2 in which,
   said second sealing means comprises sleeve means fixed at one end and the inner passage of one of said body portions with the other end capable of projecting into the inner passage of the other of said body portions,
   and check valve positioned in said inner passage of said other body portion responsive to movement of said other end of said sleeve means into the inner passage of said other of said body portions for opening said check valve for fluid flow.

6. In a coupling as claimed in claim 2 in which,
   said second sealing means comprises a tubular member fixed in the axial passage of one of said bodies with a protruding nose portion making a cryogenic temperature liquid sealing fit in the axial passage of the other body,
   and said resilient sealing means comprising an ambient vapor sealing O-ring peripherally inserted in a groove in the end face of one of said bodies for making an ambient vapor seal concentric to said second sealing means.

7. In a coupling as claimed in claim 6 in which,
said clamp means comprises a clamp sleeve secured on one of said bodies,
a locking sleeve is secured on the other of said bodies,
a locking ring rotatably mounted on said clamp sleeve,
said locking sleeve and said locking ring having interfitting locking elements,
and said hand grip being fixed to said locking ring.

8. In a coupling as claimed in claim 1 including,
check valve means positioned in said inner passage for interrupting fluid flow upon separation of said body portions.

9. In a coupling as claimed in claim 1 in which,
said securing means includes a locking ring rotatably retained on one of said body portions,
and said locking ring and the other of said body portions having corresponding interfitting locking elements.

10. In a coupling as claimed in claim 9 in which,
said one of said body portions has a flange engaged by said locking ring,
said vapor barrier means includes an O-ring in said flange for sealing against said locking ring,
and an O-ring in said other body for sealing against said locking ring.

11. In a coupling as claimed in claim 1 in which,
said resilient sealing means includes an elastomeric O-ring with one of said bodies having an O-ring retaining groove concentrically spaced from said passage.

12. In a coupling as claimed in claim 1 including,
a tubular member fixed in the axial passage of one of said bodies,
and said tubular member having a nose portion protruding from the end face to fit closely into the axial passage of the other body.

13. In a coupling as claimed in claim 1 in which,
said securing means includes a sleeve secured to each of said bodies,
one of said sleeves has locking elements thereon,
and locking device mounted on the other of said sleeves with corresponding interfitting locking elements.

14. In a coupling as claimed in claim 13 in which,
said sleeve with interfitting locking elements is fixed to said locking ring.

15. A coupling as claimed in claim 13 in which,
said other sleeve has a protruding clamp rim,
said locking ring has an internal clamp flange engaging said rim,
and said locking elements are rotatably engagable twist-lock means.

16. In a coupling as claimed in claim 12 in which,
said sleeve terminates short of the confronting end faces of the respective bodies.

17. In a coupling as claimed in claim 13 in which,
each of said bodies has a shoulder thereon,
each sleeve has a flange engaging the respective shoulder and limiting the movement of the sleeve toward the respective end face,
and said sleeves are spaced apart, in the coupled position of said bodies.

* * * * *